April 26, 1927.
F. HOLT
1,625,854
DIE FOR MAKING CARBURETOR FRAMES
Filed April 29, 1925     8 Sheets-Sheet 1
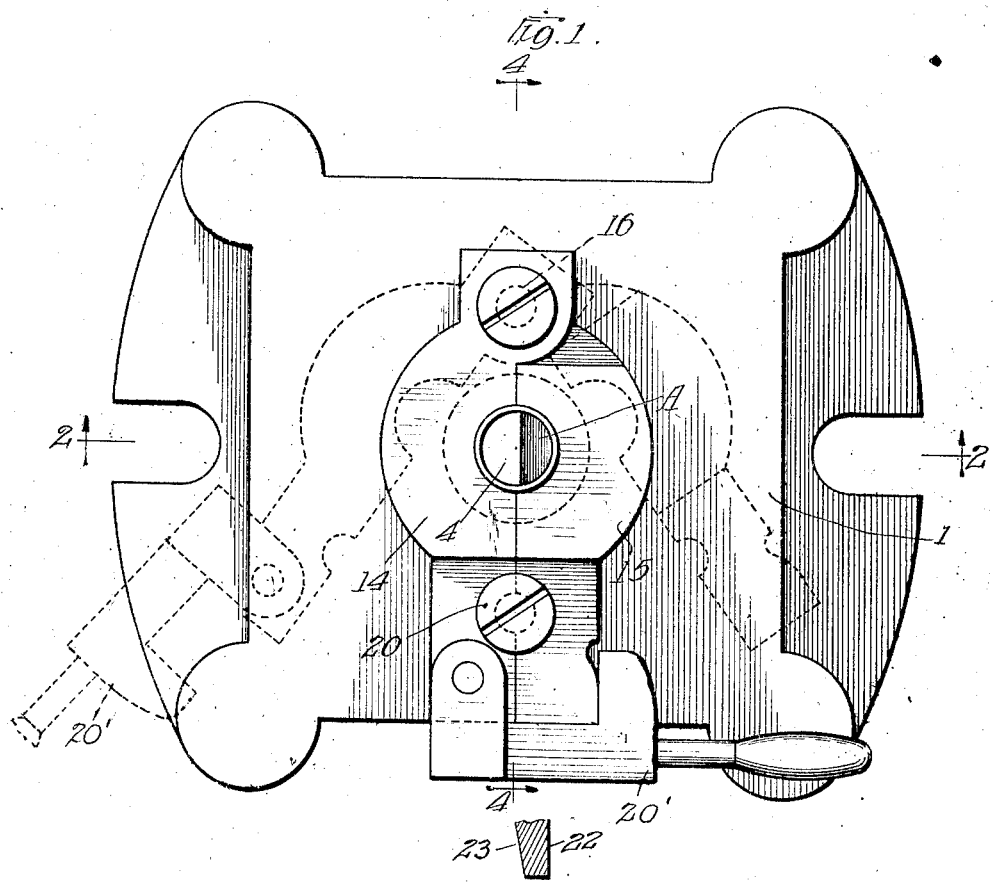
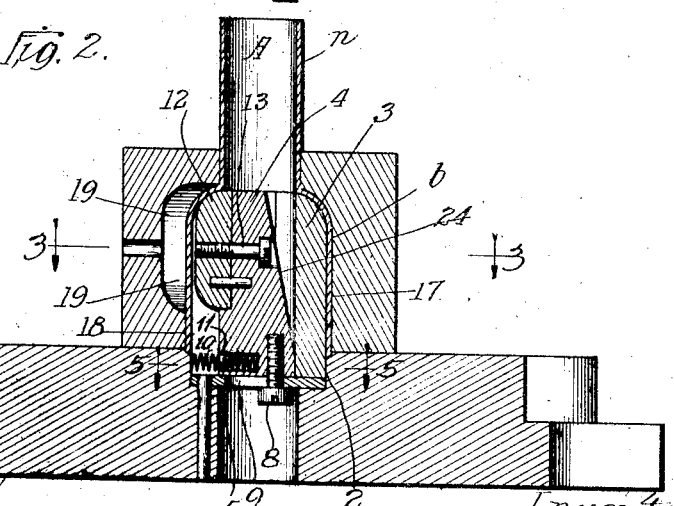

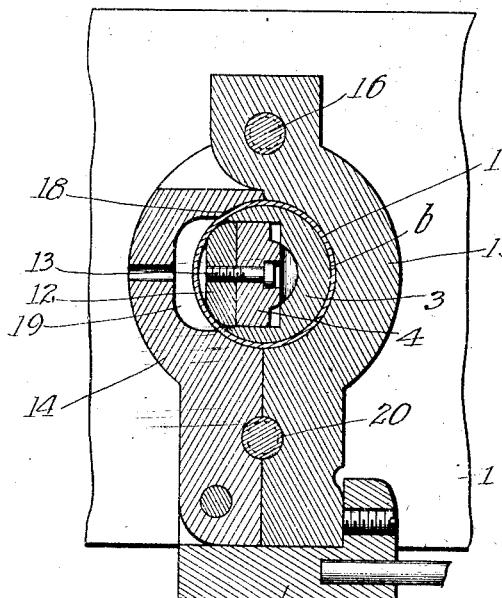
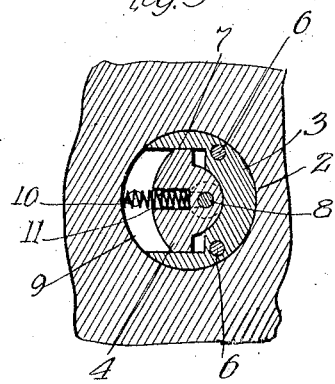
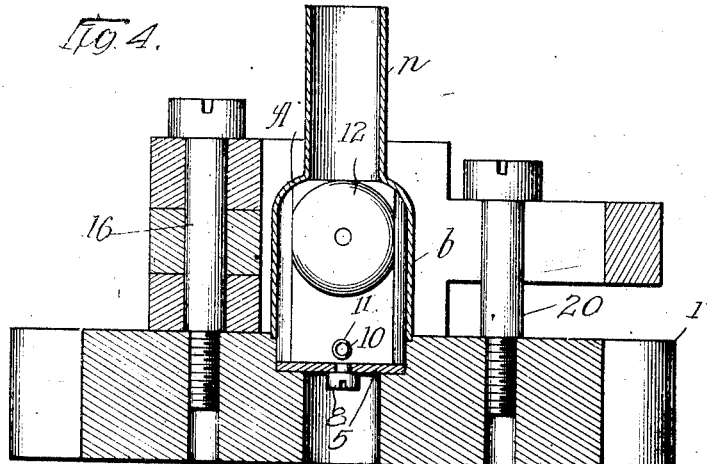

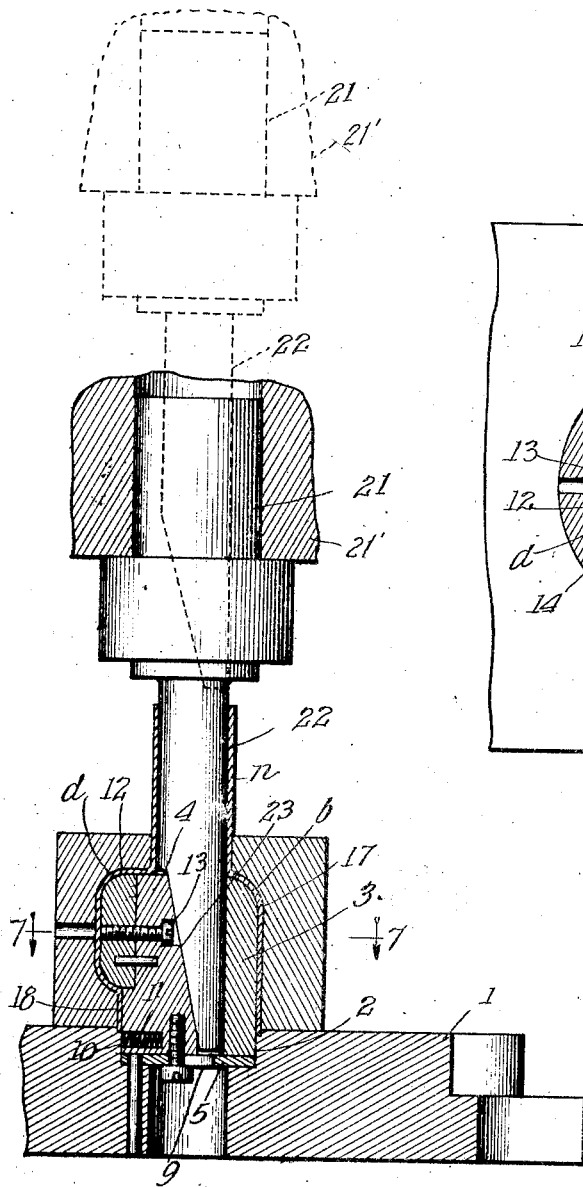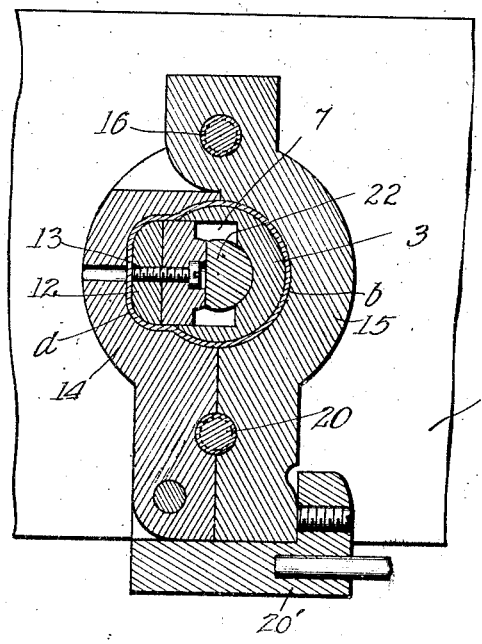

April 26, 1927.　　　　　F. HOLT　　　　　1,625,854
DIE FOR MAKING CARBURETOR FRAMES
Filed April 29. 1925　　　8 Sheets-Sheet 4

Witnesses:
William P. Kilroy
Harry A. Lovett

Inventor:
Frank Holt
By Braun, Boettcher + Dienner
Attys.

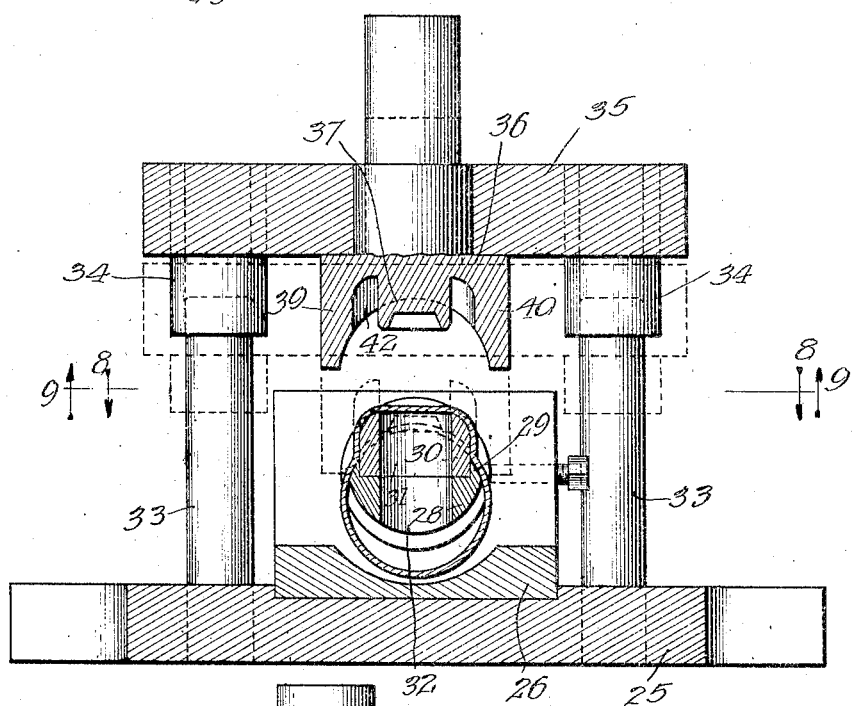
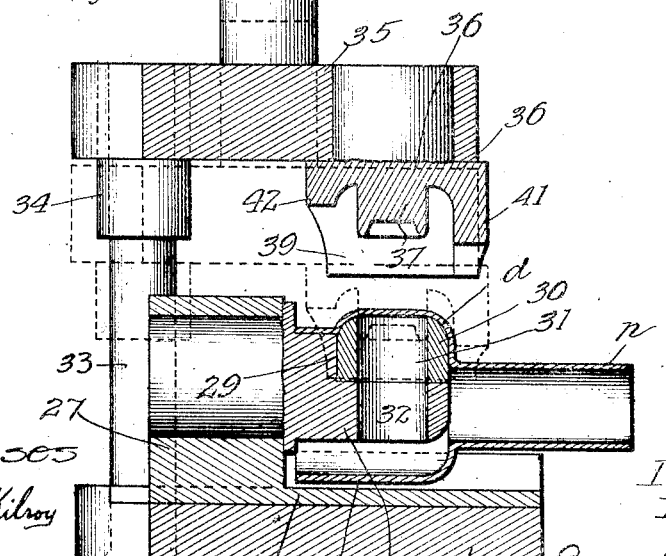

April 26, 1927.
F. HOLT
1,625,854
DIE FOR MAKING CARBURETOR FRAMES
Filed April 29, 1925     8 Sheets-Sheet 6
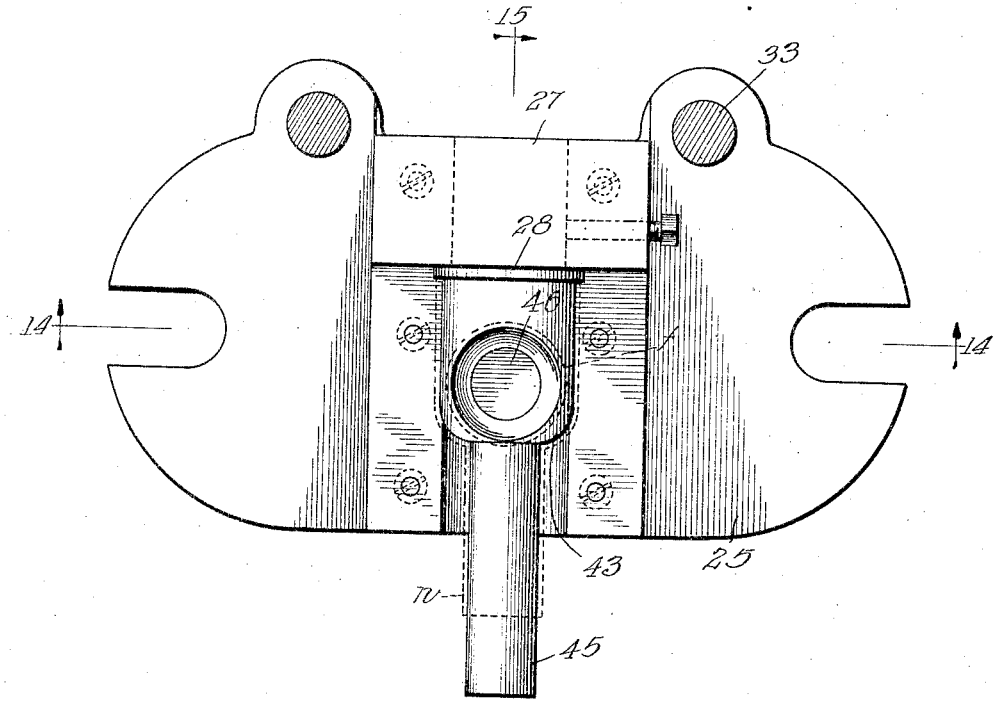
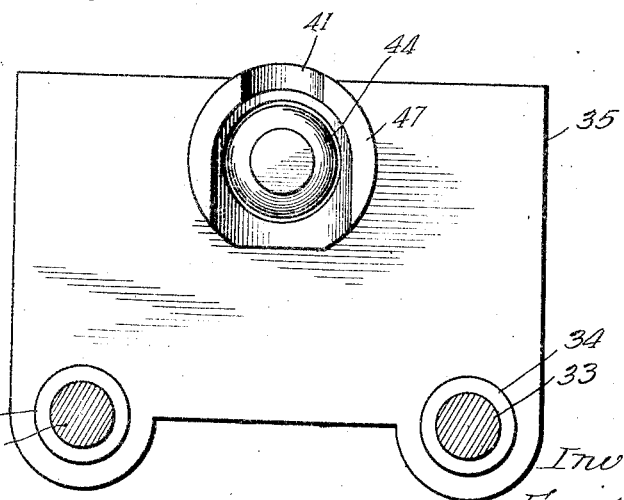

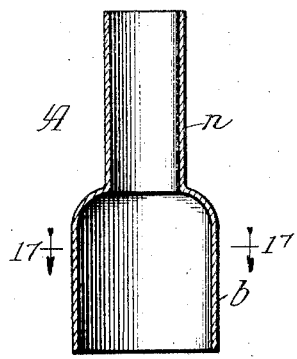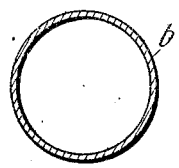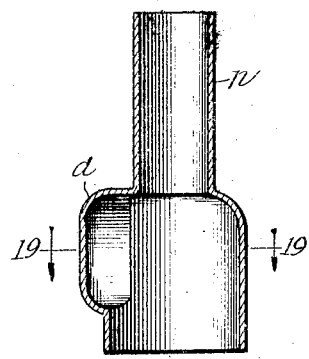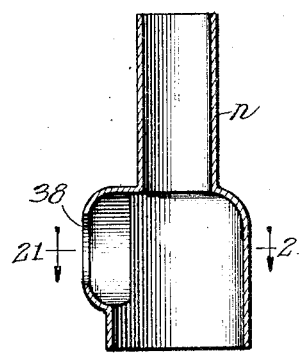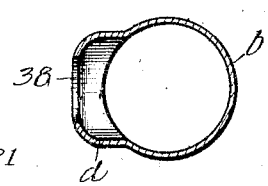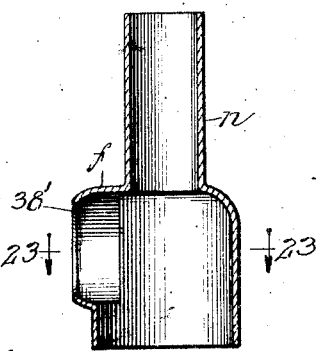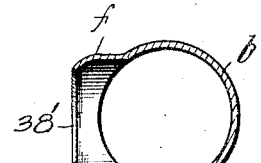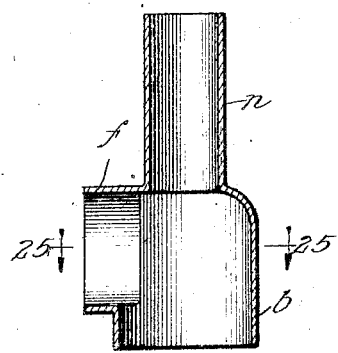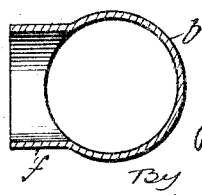

Patented Apr. 26, 1927.

1,625,854

UNITED STATES PATENT OFFICE.

FRANK HOLT, OF CHICAGO, ILLINOIS, ASSIGNOR TO STROMBERG MOTOR DEVICES COMPANY, OF CHICAGO, ILLINOIS, A CORPORATION OF ILLINOIS.

DIE FOR MAKING CARBURETOR FRAMES.

Application filed April 29, 1925. Serial No. 26,625.

This invention relates to dies for making a carburetor frame part. Heretofore the frames or bodies of carburetors have usually been in the form of castings. It has been found that by using sheet metal in the construction of carburetor frames or housings the manufacture can be greatly simplified and the cost reduced. It is the object of my invention to provide improved dies for making carburetor frame parts and particularly the main part of the sheet metal housing structure disclosed in the co-pending application of Mock, Gustafson and Chandler, Serial No. 28,771, filed May 8, 1925.

This main housing part referred to is drawn from sheet metal and comprises a base or hood part, a cylindrical neck part, and a lateral flange on the base part providing an air passageway or inlet. The present invention is concerned particularly with the formation of this lateral flange or air horn.

In accordance with my invention, a section of the wall of the base part is first deflected laterally to form a cylindrical projection, the outer wall of this projection being then pierced to make an opening of a diameter less than the greatest diameter of the projection, this leaving an embryo flange; and this embryo flange is then stretched out to final form by means of a plug inserted from the outside.

The die structures for carrying out my improved manufacturing procedure are shown on the drawings, in which:

Figure 1 is a plan view of the die structure for deflecting the housing part base;

Fig. 2 is a sectional view on line 2—2 of Fig. 1;

Fig. 3 is a sectional view on line 3—3 of Fig. 2;

Fig. 4 is a sectional view on line 4—4 of Fig. 1;

Fig. 5 is a sectional view on line 5—5 of Fig. 2;

Fig. 6 is a sectional view similar to that of Fig. 2, with the wedge member in engagement with the shiftable die member which forms the lateral deflection;

Fig. 7 is a sectional view on line 7—7 of Fig. 6;

Fig. 10 is a sectional view on line 10—10 of Fig. 8;

Fig. 11 is a sectional view on line 11—11 of Fig. 8;

Fig. 12 is a plan view of the lower member of the expanding die structure;

Fig. 13 is an underside view of the male member of the flange expanding die structure;

Figs. 16 to 25 show the different shapes of the work from the time it is placed in the deflecting die structure until it leaves the flange finishing die structure.

Figure 8:
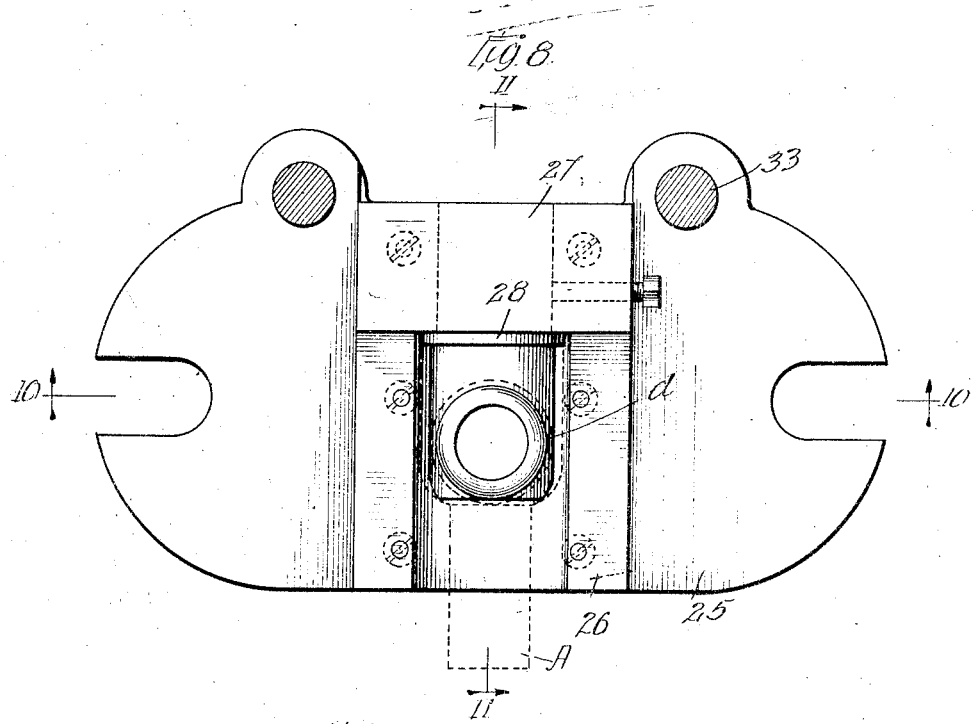
Fig. 8 is a plan view of the lower member of the piercing die structure.

Referring to Figs. 1 to 7, the base plate 1 has the cylindrical pocket 2 for receiving a spreader structure, comprising the stationary cylindrical part 3 and the movable part 4. As best shown in Fig. 5, the stationary part 3 is secured to the circular plate 5 by means of screws 6, this plate resting at the bottom of the pocket 2. The part 3 has the rectangular slot 7 in which the movable part 4 is adapted to reciprocate laterally, a screw 8 extending through the diametral slot 9 in the plate 5 and threading into the movable part 4 to hold it within the slot 7. A compression spring 10 extends from the pocket 11 in the part 4 and abuts against the wall of the pocket 2 and tends to hold the part 4 within the slot 7 against the back of the part 3, as clearly shown in Fig. 2. On the movable part 4 the die block or plunger 12 is secured as by means of the screw 13, this die block being cylindrical on a horizontal axis and having its outer edge rounded off, as clearly shown in Fig. 2. When the parts 3 and 4 are together, a seat is formed for the cylindrical base part $b$ of the blank A, the cylindrical neck $n$ extending co-axially with the base $b$.

The structure A (Figs. 2 and 16) was drawn from a single piece of sheet metal in any suitable manner. After this structure is set on the die base 1 over the spreader parts 3 and 4, these parts will be spread apart, in a manner to be hereinafter described, to cause the die block 12 to form the lateral projection $d$ shown in Fig. 18. The work is rigidly held on the spreader structure by the clamping jaws 14 and 15 pivoted on the post 16, the jaw 15 having the semi-cylindrical pocket 17, and the jaw 14 having the semi-cylindrical pocket 18 and the die pocket or space 19 opposite the die block 12. An abutment post 20 accurately aligns the clamping jaws, and a latch hook 20' pivoted to the jaw 14 when brought into engagement with the jaw 15, as shown in Figs. 1 and 3, will securely lock the jaws together. The work is now ready to receive its lateral deflection and this is accomplished by the shifting or spreading away of the part 4 from the part 3, this spreading action causing the die block 12 to deflect a section of the metal in the base $b$ into the die space or pocket 19 to form the deflection or extension $d$, Figs. 18 and 19. The spreading tool is best shown in Fig. 6. A bar 21 is vertically reciprocable in a frame 21', and at its outer end has the cylindrical spreader plug 22, which is cut away at its lower end to provide the inclined or wedge surface 23 for co-operating with the inclined or wedge surface 24 on the back of the movable spreader part 4. The spreader plug is reciprocated co-axially with the work A so that it will travel down the cylindrical neck $n$ thereof and with its lower end between the movable spreader part 4 and the stationary part 3, the resulting wedging action powerfully forcing the part 4 laterally with the die block 12 against the side of the base $b$, to deflect out this side to form the lateral projection $d$, already referred to. After the spreading or deflecting operation, the spreader plug is withdrawn and the spring 10 restores the part 4 to its normal position, when, after the clamping jaws have been released, the work, which now has the shape shown in Figs. 6, 18 and 10, can be readily withdrawn from the die structure.

Figure 9:
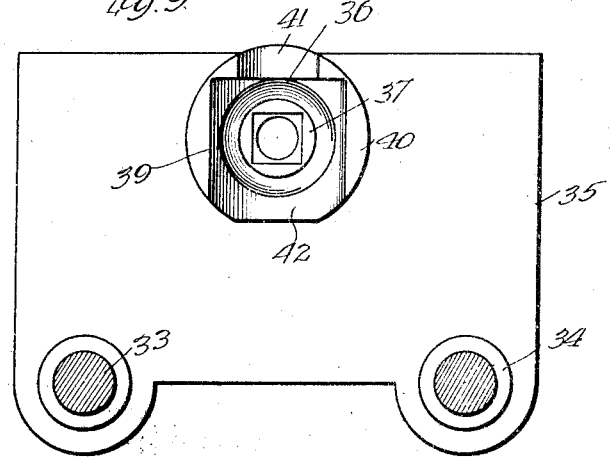
Fig. 9 is an underside view of the male member of the piercing die structure.

The work is now subjected to a piercing operation in the die structure shown in Figs. 8 to 11, this piercing operation forming a hole in the outer wall of the deflected part $d$. Rigidly supported on the base 25 of the lower die structure is the plate 26 which has the lugs 27 at its inner end from which extends forwardly the die mandrel 28. The top of this mandrel is shaped to fit the cylindrical wall of the base part $b$ of the work, so that the work will be held in horizontal position, as best shown in Fig. 11. The mandrel has the cylindrical pocket 29 in its upper side for supporting the die block 30. This block is of such diameter and so rounded at its upper end that it will accurately fit into the deflection or extension part $d$ of the work. The die block has the die passageway 31 therethrough of a diameter depending upon the size of the hole it is desired to punch in the outer wall of the deflected part $d$, and below the passageway the mandrel 28 has the discharge passageway 32 for the metal punched out.

The base 25 has vertical guide posts 33 for receiving the guide sleeves 34 on the plate 35 which supports the upper die member. This upper die member is in the form of a head 36 having the punch extension or plug 37 which is concentric with the lower die member 30. Suitable means are provided for forcing downwardly the plate 35 with the upper die member thereon, so that the punch 37 will engage with the outer wall of the deflection part $d$ to cut out the section thereof above the die passageway 31 and to leave a hole 38 (Figs. 20 and 21). The head 36 has the depending side walls 39 and 40 for engaging with the sides of the base part $b$ of the work, and also the front and rear walls 41 and 42, whose lower edges are properly rounded for engagement, respectively, with the neck $n$ and base $b$ of the work, the engagement of these various walls with the work securely holding the work to the mandrel 28 during the punching operation. When the upper die member is raised the mandrel 28 will hold the work while the punch 37 is withdrawn therefrom.

After the piercing operation the work is in the condition shown in Figs. 20 and 21, the hole 38 being of a diameter reduced to an extent depending upon the length of the flange desired. As will be next explained, the rounded or inwardly curved section of the deflection $d$ will be straightened out so that a cylindrical flange will be formed to bring the work to the final shape shown in Fig. 24. The length of this flange will depend upon the diameter of the hole 38. If a longer flange is desired, the diameter of the hole is correspondingly reduced and if a shorter flange is desired, the diameter is correspondingly increased.

Figure 14:
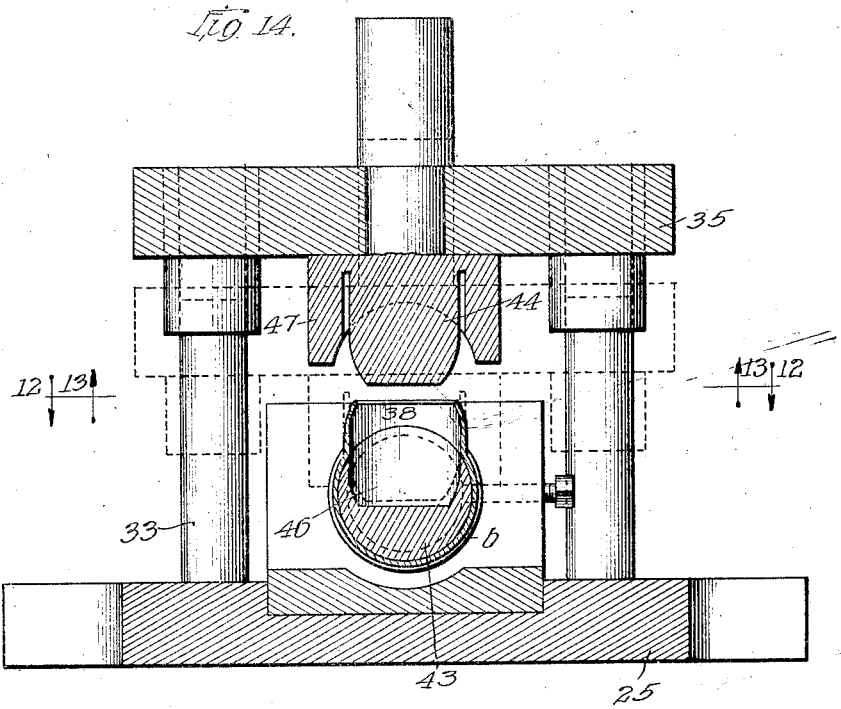
Fig. 14 is a sectional view on line 14—14 of Fig. 12.
Figure 15:
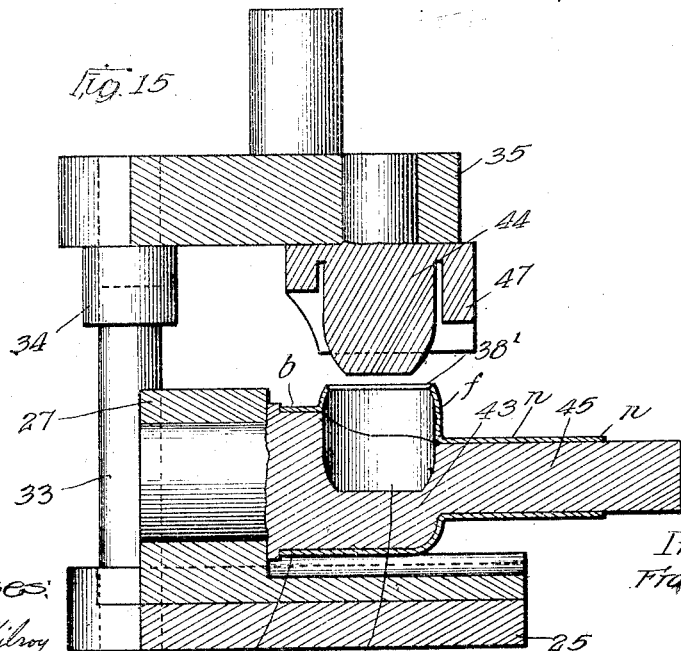
Fig. 15 is a sectional view on line 15—15 of Fig. 12.

In order that the sheet metal, preferably steel, will respond more easily in the various die structures, the work is annealed before each die operation. The punching of the hole in the deflection $d$ has a tendency to cause the metal around the hole to temper or harden, in other words, to become more or less brittle. This brittle metal surrounding the hole is, therefore, preferably removed before the stretching or expansion operation to form the finished cylindrical flange, and the hole is, therefore, reamed down to the softer and more ductile metal. Fig. 22 shows the work after such reaming operation, and the work is now ready for operation in the die structure shown in Figs. 12 to 15. The supporting frame work of this die mechanism is exactly the same as that shown in Figs. 8 to 11 for the piercing operation, with the exception of the die mandrel 43 and the expansion die member 44, which are substituted for the mandrel and punch member for the piercing operation. The die mandrel 43 is supported from the lug 27, its body part receiving and fitting the base part b of the work, and the extension 45 receiving the neck n. The work is supported with the embryo flange f extending upwardly and with the reamed opening 38' in the path of the expansion lug 44. The lower end of the lug is tapered so that it will readily enter the hole 38'. The passage of this tapered end through the hole and its engagement with the metal adjacent the hole will expand the metal until the upper cylindrical portion of the lug has passed through the hole, whereafter the flange will be cylindrical throughout its extent, as shown in Figs. 24 and 25. The mandrel 43 has the clearance space 46 for the expansion plug, and surrounding the plug are the various walls 47 for seating against the work around the flange while it is being formed. It will be noted in Fig. 4 that the die block or plunger 12 is slightly flattened on the sides, so that the deflection d will be partly flattened at the sides. This flattening or restriction is ironed out when the expanding plug 44 enters the work, the finished flange being fully expanded to uniform diameter in all directions. After formation of the flange its outer edge and also the edges of the base and neck sections are finished off to be true and smooth. In practice, the base part b of the frame part encloses the various fuel feed devices and the neck n forms a fuel and mixture passageway and outlet, while the flange f serves to support an air intake extension with air flow controlling parts therein.

I thus produce a strong light frame or housing for carburetors whose inner surfaces are uniform and smooth and require no finishing operation.

Having described my invention, I claim as follows:

1. Die mechanism for forming a lateral cylindrical flange on a cylindrical shell comprising spreader mechanism for intimately receiving the shell, a cam block on said spreader mechanism, means co-operating with said spreader mechanism to force said cam block against the cylindrical shell wall to form a lateral bulge thereon, means for punching a hole through the outer wall of said bulge, and an expansion plug for entering said bulge hole from the outside and expanding the metal around said hole into the lateral flange.

2. In die mechanism for forming a lateral cylindrical flange on a cylindrical sheet metal shell, the combination with spreader mechanism for intimately receiving said shell, said spreader mechanism comprising a stationary part and a laterally shiftable part, said shiftable part having a die block secured thereto, and a plunger wedge for co-operating with said spreader mechanism to shift its shiftable part laterally, whereby said die block will be shifted against the wall of a tubular shell received by said spreader mechanism and deflected outwardly to form an embryo flange.

3. In die mechanism for use in forming a lateral flange on a tubular shell, the combination of a spreader block for intimately receiving a shell, said spreader block comprising a stationary member and a laterally shiftable member, a die block secured to the shiftable member, said die block having the shape of the flange intended to be formed, and a spreader member adapted for wedging engagement with said spreader block to force said shiftable member and the die block thereon laterally.

4. In die mechanism for use in forming a lateral flange on a tubular shell, the combination of a spreader block for intimately receiving a shell, said spreader block comprising a stationary member having a radial slot and a shiftable member shiftable in said slot, a die block secured to the shiftable member, said die block having the shape of the flange intended to be formed, and a spreader member adapted for wedging engagement between said stationary member and shiftable member to force said shiftable member outwardly in the die block thereon against a shell to form the flange thereon.

In witness whereof, I hereunto subscribe my name this 23rd day of March, 1925.

FRANK HOLT.